United States Patent Office 3,128,305
Patented Apr. 7, 1964

3,128,305
PROCESS FOR THE RECOVERY OF
L-GLUTAMIC ACID
William F. Phillips, Terre Haute, Ind., assignor to Commercial Solvents Corporation, New York, N.Y., a corporation of Maryland
No Drawing. Filed Oct. 14, 1960, Ser. No. 62,530
3 Claims. (Cl. 260—527)

My invention relates to the recovery of L-glutamic acid and more particularly my invention relates to the recovery of L-glutamic acid produced by the fermentation of glutamic acid producing microorganisms.

L-glutamic acid is produced in high yields by the fermentation of nutrient media with certain microorganisms including E. coli, Aerobacter aerogenes, B. subtilis, Cephalosporium acremonius, Micrococcus varius, Micrococcus glutamicus, Brevibacterium divericatum, etc. Even though satisfactory yields of L-glutamic acid are obtained by fermentation processes, numerous problems have arisen which make recovery of L-glutamic acid extremely difficult. Presently L-glutamic acid is recovered from its fermentation medium by filtering the fermentation medium to remove bacterial cells and other minor insoluble impurities, condensing the filtrate and adjusting the filtrate to a pH of 3.2 by acid addition to crystallize glutamic acid. The main problem presented by present recovery processes is the necessity for the removal of cells by filtration. Because the bacterial cells are of microscopic size and form a stable suspension in the fermentation medium, great difficulty is encountered in attempting to separate prior to crystallization of pure glutamic acid, these cells from the soluble portion of the medium containing glutamic acid. To obtain even reasonably satisfactory results, not only must repeated filtrations be employed, but abnormally large amounts of filter-aids such as diatomaceous earths must be used in the filtration process both resulting in increased costs in labor, materials, and equipment. The resulting filter cake from the filtration treatments must then be discarded as waste material which results in loss of glutamic acid.

I have now discovered a process whereby L-glutamic acid can be recovered from its fermentation medium without subjection of the fermentation medium to filtration. My new process for recovering glutamic acid not only permits the removal of bacterial cells from the fermentation medium without the need for filtration but does not result in significant losses of glutamic acid during recovery.

My process generally consists of treating the fermentation medium with acetone to cause flocculation of the cells in the fermentation medium. The cell containing flocculent precipitate produced from the acetone treatment can then be easily separated from the glutamic acid containing supernatant liquid, the remaining acetone then can be removed from the supernatant and the glutamic acid can hence be recovered by any suitable means without the need for filtration. Any suitable process for further recovery of glutamic acid can then be utilized. One means, for example, is concentrating the thus treated supernatant liquid, adjusting the pH of the thus concentrated supernatant liquid to about 3 to crystallize glutamic acid and recovering glutamic acid.

In carrying out the process of my invention, it is necessary, in order to separate the cells from their stable suspension in the fermentation medium to use at least 0.5 volumes of acetone for each volume of fermentation medium to be treated. Large excesses of acetone, generally in the order of more than two volumes of acetone for each volume of fermentation medium to be treated result in the formation of thick gummy unmanageable precipitates which generally hinder proper recovery. Therefore, in order to obtain completely satisfactory results, I generally prefer to utilize from about 0.8 to about 1.2 volumes of acetone for every volume of fermentation medium treated with optimum results being achieved when equal volumes of acetone and fermentation medium are utilized.

In my invention I can utilize previously unconcentrated fermentation media or if desired I can concentrate glutamic acid containing fermentation media prior to their acetone treatment in order to reduce the total amount of acetone required. Any suitable means for concentrating the fermentation medium such as distillation under vacuum can be utilized.

In separating the cell-containing flocculent precipitate from the glutamic acid containing supernatant liquid, I can use any suitable means. Such means include decantation and centrifugation or combinations of the two. The acetone present in the supernatant liquid can also be recovered by any suitable means. I prefer to remove acetone by distillation. The acetone utilized in my process when removed by distillation can be easily recovered and then be re-used for additional glutamic acid recovery.

It is understood that the example given below is for the purposes of illustration only and that I am not bound to the specific ingredients or amounts thereof or to the specific operating conditions set out therein. However, I intend to include all equivalents obvious to the art.

Example I

To a 340-milliliter portion of nutrient fermentation medium containing 16.3 milligrams of L-glutamic acid per milliliter were added 340 milliliters of acetone with thorough mixing. The resulting mixture was then allowed to stand until flocculation of bacterial cells took place. The flocculent cell-containing precipitate was separated from the fermentation medium by centrifugation, washed with 50% acetone, and dried to yield 1.31 grams of a light buff powder containing <10 milligrams of L-glutamic acid per gram. Acetone was then removed from the glutamic acid-containing supernatant liquid by distillation. The pH of the thus distilled supernatant liquid containing glutamic acid was then adjusted to 3.2 by addition of sulfuric acid. The glutamic acid then crystallized out upon cooling to 5° C. to yield 3.2 grams of substantially pure L-glutamic acid.

Example II

A 100-milliliter portion of nutrient fermentation medium containing 34.7 milligrams per milliliter of L-glutamic acid was concentrated by distillation under reduced pressure at about 30 to 40° C. to a volume of 20 milliliters. To the 20-milliliter portion were then added 20 milliliters of acetone with thorough mixing. The resulting mixture was then allowed to stand until flocculation of bacterial cells took place. The flocculent cell-containing precipitate was separated from the fermentation medium by centrifugation, washed with acetone, and dried to yield 0.67 gram of a light buff powder containing <10 milligrams of L-glutamic acid per gram. Acetone was then removed from the supernatant liquid by distillation. The pH of the thus distilled supernatant liquid containing L-glutamic acid was then adjusted to 3.0 with sulfuric acid. The L-glutamic acid then crystallized out upon cooling to 5° C. A yield of 2.62 grams of substantially pure L-glutamic acid was thus obtained.

Now having described my invention, what I claim is:

1. A process for the recovery of L-glutamic acid from its fermentation medium which comprises treating an L-glutamic acid containing fermentation medium with from about 0.8 to about 1.2 volumes of acetone per volume of fermentation medium to cause flocculation of bacterial cells, separating the flocculent cells from the L-glutamic acid containing medium, and recovering L-glutamic acid.

2. The process of claim 1 wherein the fermentation medium is concentrated before being treated with acetone.

3. In a process for the recovery of L-glutamic acid from its fermentation medium by acidifying the fermentation medium to a pH of about 3 to crystallize L-glutamic acid, the improvement of treating the L-glutamic acid containing fermentation medium with from about 0.8 to about 1.2 volumes of acetone per volume of fermentation medium to cause flocculation of bacterial cells present in the fermentation medium, separating the flocculent cells from the L-glutamic acid containing medium, separating acetone from the L-glutamic acid containing medium, the said acetone treatment being conducted prior to acidification of the L-glutamic acid containing fermentation medium.

References Cited in the file of this patent
UNITED STATES PATENTS

| | | |
|---|---|---|
| 2,976,218 | Gorton | Mar. 21, 1961 |
| 2,978,383 | Yamada | Apr. 4, 1961 |